US012333641B2

(12) United States Patent
Yang

(10) Patent No.: US 12,333,641 B2
(45) Date of Patent: *Jun. 17, 2025

(54) RANDOM ACCESSIBLE LOSSLESS PARAMETER DATA COMPRESSION FOR TILE BASED 3D COMPUTER GRAPHICS SYSTEMS

(71) Applicant: Imagination Technologies Limited, Kings Langley (GB)

(72) Inventor: Xile Yang, Rickmansworth (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,138

(22) Filed: Apr. 11, 2023

(65) Prior Publication Data
US 2023/0245372 A1    Aug. 3, 2023

Related U.S. Application Data

(63) Continuation of application No. 17/339,702, filed on Jun. 4, 2021, now Pat. No. 11,625,883, which is a continuation of application No. 16/454,986, filed on Jun. 27, 2019, now Pat. No. 11,043,016, which is a continuation of application No. 15/044,983, filed on Feb. 16, 2016, now Pat. No. 10,380,781, which is a continuation of application No. 14/486,848, filed on Sep. 15, 2014, now Pat. No. 9,292,960, which is a
(Continued)

(30) Foreign Application Priority Data
Sep. 10, 2010    (GB) .................................... 1015149

(51) Int. Cl.
*G06T 15/00*   (2011.01)
*G06T 9/00*    (2006.01)

(52) U.S. Cl.
CPC ................ *G06T 15/00* (2013.01); *G06T 9/00* (2013.01)

(58) Field of Classification Search
CPC ................................ G06T 9/00; G06T 15/00
USPC ........................................ 345/501, 555, 581
See application file for complete search history.

(56) References Cited

U.S. PATENT DOCUMENTS

| 5,617,517 A | 4/1997 | Chi |
| 6,055,017 A | 4/2000 | Shen et al. |
| 6,281,816 B1 | 8/2001 | Kampf |

(Continued)

FOREIGN PATENT DOCUMENTS

| CN | 101354788 A | 1/2009 |
| EP | 0703549 A2 | 3/1996 |

(Continued)

*Primary Examiner* — Jacinta M Crawford
(74) *Attorney, Agent, or Firm* — Potomac Law Group, PLLC; Vincent M DeLuca

(57) ABSTRACT

A method and apparatus are provided for compressing vertex parameter data in a 3D computer graphic system, where the vertex parameter data is a data block relating to a plurality of vertices used for rendering an image. The data relating to each vertex includes multiple byte data relating to at least one parameter. The parameters include X, Y and Z coordinates and further coordinates for texturing and shading. The multiple byte data is divided into individual bytes and bytes with corresponding byte positions relating to each vertex are grouped together to form a plurality of byte blocks.

20 Claims, 6 Drawing Sheets

Related U.S. Application Data continuation of application No. 13/199,884, filed on Sep. 12, 2011, now Pat. No. 8,836,696.

(56) References Cited

U.S. PATENT DOCUMENTS

| | | |
|---|---|---|
| 7,324,115 B2 | 1/2008 | Fraser |
| 7,961,195 B1 | 6/2011 | Rogers et al. |
| 2001/0055032 A1 | 12/2001 | Saito et al. |
| 2006/0115166 A1 | 6/2006 | Sung et al. |
| 2007/0153013 A1 | 7/2007 | Wells et al. |
| 2007/0217704 A1 | 9/2007 | Zeng et al. |
| 2009/0021521 A1 | 1/2009 | Sorgard et al. |
| 2009/0226084 A1 | 9/2009 | Courchesne et al. |
| 2009/0295816 A1 | 12/2009 | Kallio |
| 2010/0254621 A1 | 10/2010 | Wennersten et al. |
| 2011/0046923 A1 | 2/2011 | Lee et al. |
| 2012/0189215 A1 | 7/2012 | Deshpande |

FOREIGN PATENT DOCUMENTS

| | | | | |
|---|---|---|---|---|
| EP | 0797358 A2 | 9/1997 | | |
| EP | 0889440 A2 | 1/1999 | | |
| JP | 04195421 A | 7/1992 | | |
| JP | 07078066 A | 3/1995 | | |
| JP | 2002008060 A | 1/2002 | | |
| JP | 2009055308 A | 3/2009 | | |
| KR | 20060005616 A | * 1/2006 | .......... | H03M 7/6011 |
| WO | 2009128617 A2 | 10/2009 | | |
| WO | 2010144491 A2 | 12/2010 | | |

\* cited by examiner

RANDOM ACCESSIBLE LOSSLESS PARAMETER DATA COMPRESSION FOR TILE BASED 3D COMPUTER GRAPHICS SYSTEMS

CROSS REFERENCE TO RELATED APPLICATIONS

This application is a continuation under 35 U.S.C. 120 of copending application Ser. No. 17/339,702 filed Jun. 4, 2021, now U.S. Pat. No. 11,625,883, which is a continuation of prior application Ser. No. 16/454,986 filed Jun. 27, 2019, now U.S. Pat. No. 11,043,016, which is a continuation of prior application Ser. No. 15/044,983 filed Feb. 16, 2016, now U.S. Pat. No. 10,380,781, which is a continuation of prior U.S. application Ser. No. 13/199,884, filed Sep. 12, 2011, now U.S. Pat. No. 8,836,696, which claims foreign priority under 35 U.S.C. 119 from GB 1015149.6, filed on Sep. 10, 2010, the contents of which are incorporated by reference herein in their entirety.

FIELD OF THE INVENTION

This invention relates to methods and apparatus for lossless compression of parameter data in tile based 3-dimensional computer graphics systems.

BACKGROUND TO THE INVENTION

As the technologies develop rapidly, the complexity of 3-dimensional computer generated images increases at the same pace. One can easily build a computer model for very complicated 3D objects, like human movements using vertices and triangle meshes. This kind of 3D model can then be sent to a 3D computer graphics system where animated 3D images can be generated on a computer screen. Computer generated 3D animated images are widely used in 3D computer games, navigation tools and computer aided engineering design tools.

3D computer graphics system have to cope with the constant demands for more complex graphics and faster speed of display. As details in the display model increase, more and more graphics primitives and vertices are used. Also as texturing and shading techniques have evolved, especially with the use of programmable shader languages, more and more information is associated with vertex data (vertex parameter data). In some cases the vertex parameter data size can be around 100 32 bits words per vertex, and there may be a million vertices in a render of an image. So the memory space for the vertex parameter data in a 3D render can easily reach hundreds of MB.

Because of the amount of vertex parameter data a 3D computer graphics system needs to process, the performance of the system is often limited by vertex parameter data memory bandwidth. This is especially true for tile based 3D computer graphics systems, in which vertex parameter data written to internal memory may be read multiple times for the different tiles where the vertices from the primitives are needed to perform a render. It would be very beneficial for the performance of the 3D computer graphics systems to reduce the vertex parameter data bandwidth by compressing the vertex parameter data used in 3D rendering.

As is well known to those skilled in the art, tile based 3D computer graphics systems divide a render surface into a plurality of n×m pixel tiles. A primitive such as a triangle, line or point is only processed for tiles which overlap the primitive. The main steps performed for tiling in a tile based 3D computer graphics system are shown in FIG. 1.

In a 3D render, primitives contain certain shared vertices and primitives in similar locations may arrive sequentially in time. To make memory access for the vertex parameter data more efficient, a tile based 3D computer graphics system can define a bounding box of tiles around a primitive and restrict the number of incoming primitives in dependence on the tiles in the bounding box and the primitives they contain. This allows the vertex parameter data from primitives which overlap these tiles to be grouped together into primitive blocks. The primitives are constructed by indices which index into these primitive blocks. To control the buffer size of vertex parameter data there is normally a limit of a maximum number of vertices and primitives contained within a primitive block, for example 32 vertices and 64 primitives. The data structure from a primitive block is shown in FIG. 2. There are Primitive Block Header Words at the start used for the definition of vertex parameter data in the primitive block, such as number of vertices and number of primitives, as 20 in FIG. 2. The Primitive Block Header Words are followed by vertex parameter data from a number of vertices in the primitive block, as 21 in FIG. 2.

In this scheme some of the primitives from a primitive block may be referenced by some tiles and the other primitives may be referenced in other tiles during the 3D render. The access for the vertex parameter data in the primitive block requires random access to the primitive block from the data stream. Also the vertex parameter data in a primitive block may be needed for renders in different tiles, so the vertex parameter data is written once and may be read multiple times.

The general requirements for the algorithm of 3D vertex parameter data compression are fast speed, lossless compression, and minimum memory space used by the compression and decompression algorithms themselves. This is because of the demand for fast speed and high quality 3D computer graphics system to be implemented in a small silicon area in an integrated circuit.

For tile based 3D computer graphics system the additional requirements for vertex parameter data compression algorithms are the ability of random data access from a compressed data stream, and fast and simple algorithms in decompression.

Some of the general lossless compression algorithms such as Huffman coding/decoding need a general sized data buffer to perform the compression. This is not suitable for a 3D computer graphics system with a limited silicon area. Run Length encoding does not need the extra data buffer for compression, but like the other entropy encoding algorithms, data compression is performed on sequentially accessed data streams such as a colour data stream in a video display. If used in a tile based 3D computer graphics system the whole vertex parameter data stream for a primitive block needs to be decompressed before any vertex data can be accessed. This is extremely inefficient for tile based rendering especially if the primitive blocks contain large triangles covering many tiles, in which case the whole vertex parameter data stream is decompressed many times even when only a few vertices from the primitive blocks are used.

Normally vertex parameter data values are stored as 32 bits floating point values in a 3D computer graphics system. Using fixed point representation for the floating point vertex data values can compress vertex data in a primitive block well. A floating point value can be represented by an integer together with a fixed number of fractional bits in the fixed point format. The method will cause reduced accuracy but may work well on X and Y coordinates data from vertices. Because the display resolution on a computer graphics screen is fixed to a fraction of a pixel unit, X and Y coordinates from primitives rendered on screen are converted from the original floating point values into screen values which have limited resolution.

For other vertex parameter data like Z for depth, RHW and texture coordinate sets, high accuracy of the data needs to be maintained through the 3D display pipeline. Artifacts in the rendered images may be caused by reduced accuracy of representation in these vertex parameter data.

Some vertex data compression algorithms compress vertex parameter data values according to the geometrical location of the vertices. For example a vertex is chosen as the origin in a triangle mesh, the difference values (delta values) between the vertex parameter data and the parameter data from the origin vertex are stored instead of the full vertex parameter data values. The delta values can be represented by integers or fixed point values with a reduced range to compress the data stream. This kind of algorithm works well for the vertices from a triangle mesh where the vertex parameter data values among the vertices is in a limited range. The compression ratio is related to the number of bits required to represent the delta values. Very often triangle meshes such as long triangle strips may contain vertices for which the range of the vertex data values is big in a primitive block. In this case compression will not be possible due to many bits being needed to store the delta values.

To reduce the vertex parameter data memory bandwidth in tile based 3D computer graphics system all primitives from an input stream are pre processed to remove any primitives which are either off screen, back facing, clipped or too small to be displayed. After pre processing the remaining primitives are merged into primitive blocks with a fixed number of vertices and written into internal parameter memory for 3D processing. Therefore the vertices in a primitive block are not guaranteed to belong to a single triangle mesh, the ranges of vertex parameter data values in a primitive block may be too big to be compressed with delta values from vertex origins.

SUMMARY OF THE INVENTION

Preferred embodiments of the present invention comprise lossless compression methods and systems which can be used for 3D computer graphics vertex parameter data compression. They allow graphics vertex parameter data to be stored in a smaller memory space and so reduce the memory requirements for graphics devices. The invention can employ algorithms that are simple, fast and with very limited storage buffer requirement. The algorithms also have fixed sized vertex parameter data after compression thereby allowing random access of the compressed vertex data in the primitive block data stream, which is especially beneficial for tile based 3D computer graphics system.

In a first aspect, the invention provides a method of compressing vertex parameter data in a 3D computer graphics system, wherein the vertex parameter data comprises a data block relating to a plurality of vertices, the data relating to each vertex including multiple byte data relating to at least one parameter, the method comprising the steps of:
dividing the multiple byte data into individual bytes;
grouping together corresponding bytes from the data relating to each vertex to form a plurality of byte blocks; and
compressing the byte blocks using a compression algorithm.

The term "corresponding bytes" as used herein refers to the byte position within the multiple byte data. So the most significant bytes (MSB) of the data values describing a particular parameter for each vertex are grouped together to form a byte block of MSBs. Similarly, the least significant bytes (LSB) of each of the data values for that parameter are grouped together to form another byte block. The inventor has found that in graphics vertex parameter data there is often greater correlation between corresponding individual bytes of multiple byte values, and so greater scope for compression, than there is between the complete multiple byte values. Different byte blocks may be compressed using different compression algorithm depending on their content. For example, if all of the bytes in a byte block are identical, that byte block can more efficiently compressed than if the bytes are spread over a large range of values.

The vertex parameter data is typically floating point data, such as 32-bit floating point data, but the invention is equally applicable to fixed point value data.

Vertex parameters can be, for example, X, Y and Z co-ordinates as well as RHW and texture co-ordinates U, V, S and T.

To allow a determination of an appropriate compression algorithm, the step of compressing the byte blocks preferably comprises assessing the content of the byte block and selecting a compression algorithm based on the content of the byte block. The step of assessing preferably comprises determining the number of unique bytes in the byte block and determining the spread of the unique bytes.

If the vertex parameter data for each parameter of a vertex includes a sign bit, the method further comprises the step of moving the sign bit to the least significant byte prior to the step of dividing. This is beneficial as the MSBs typically have greater correlation that the LSBs, and moving the sign bit to the LSB therefore increases the compressibility of the MSB byte block but does not significantly affect the compressibility of the LSB byte block.

The step of compressing may comprise compressing a first byte block using a first compression algorithm and a second byte block using a second compression algorithm.

One preferred compression method comprises the steps of: storing at least one byte in a byte block as a byte origin, and storing each of the remaining bytes in the byte block as a difference value from a byte origin. The byte with the lowest value in the byte block is preferably chosen as a byte origin.

The method preferably comprises storing a plurality of bytes in a byte block as separate byte origins, and storing each of the remaining bytes in the byte block as a difference value from one of the byte origins. The use of multiple byte origins allows data to be compressed that that cannot be compressed using only a single byte origin.

Preferably, the step of compressing comprises storing the minimum number of bytes in a byte block as byte origins necessary for all of the difference values to be less than a predetermined value. There may also be a maximum number of byte origins set by the graphics system, so that if the maximum number is reached and the difference values still exceed the predetermined value, a different compression scheme must be used.

The byte data in a byte block are preferably sorted in a descending or ascending order, to allow the byte origins which can be used to compress the data block with difference values below a predetermined value to be calculated. The method of the present invention identifies the byte origins when the parameter byte data of each vertex arrives for compression, without needing to sort the byte block in an initial, separate step.

Preferably, the step of compressing further comprises:
a) storing a first byte and a second byte from a byte block as maximum and minimum byte values defining a byte range;
b) checking the value of the subsequent byte, and if the value of the subsequent byte is outside the byte range, replacing the maximum or minimum byte value with the value of the subsequent byte to form updated maximum and minimum byte values and an update byte range;
c) repeating step b) for each subsequent byte in the byte block until the number of bits required to define the byte range exceeds a predetermined number of bits, then
d) splitting the byte range into two byte ranges, each of the two ranges definable using the predetermined number of bits or fewer;
e) checking the value of each subsequent byte and if the value of a subsequent byte is outside all of the byte ranges, replacing the maximum or minimum byte value of one of the ranges with the value of the subsequent byte to form updated maximum and minimum byte values and an updated byte range;
f) repeating step e) for each subsequent byte in the byte block until the number of bits required to define a byte range exceeds the predetermined number of bits, and then repeating step e) until all of the bytes in the byte block are within a byte range; wherein the number of byte ranges in a byte block corresponds to the number of byte origins used in the step of compressing.

Preferably, the method further comprising the step of merging two byte ranges to form a merged byte range subsequent to step f).

The step of compressing may comprise storing each unique byte in the byte block in a byte table and forming a byte index encoding the bytes in the byte block by reference to the byte table.

The step of compressing may comprise the steps of:
identifying the unique bytes in a byte block;
storing at least one of the unique bytes as a raw byte origin in a byte delta table;
storing in the byte delta table remaining unique bytes as difference values from the preceding byte or from the byte origin; and
forming a byte index encoding the bytes in the byte block by reference to the byte delta table.

The step of compressing may further comprise the steps of:
storing a first of the unique bytes as a raw byte origin in a byte delta table;
storing subsequent bytes as a difference value when the difference value from the preceding byte or from the preceding byte origin is less that a predetermined value; and
storing subsequent bytes as further raw byte origins when the difference value from the preceding byte or from the preceding byte origin is equal to or greater than the predetermined value.

A plurality of the unique bytes may be stored as raw byte origins and each of the remaining bytes stored as a difference value from one of the raw byte origins. The byte delta table may then include control bits to indicate if the subsequent data in the byte delta table is a raw byte origin or a difference value.

The 3D computer graphics system is a tile based 3D computer graphics system. The present invention is particularly advantageous fro a tile based system as it allows for random access to the compressed data without having to decompress all of the data.

The method preferably further comprises the step of merging the byte blocks following the step of compressing to form a compressed data stream.

In another aspect, the invention provides apparatus for compressing vertex parameter data in a 3D computer graphics system, wherein the vertex parameter data comprises a data block relating to a plurality of vertices, the data relating to each vertex including multiple byte data relating to at least one parameter, comprising:
dividing means configured to divide the multiple byte data into individual bytes and group together corresponding bytes from the data relating to each vertex, to form a plurality of byte blocks; and
compressing means configured to compress at least one of the byte blocks using a compression algorithm.

The apparatus may further comprise assessing means configured to assess the content of the byte block and select a compression algorithm based on the content of the byte block.

The vertex parameter data for each parameter of a vertex may include a sign bit, and the apparatus may then further comprise sign bit moving means configured to move the sign bit to the least significant byte prior to the dividing of the data by the dividing means.

In a still further aspect, the invention provides a method of decompressing vertex parameter data in a 3D computer graphics system, the decompressed data relating to each vertex comprising multiple byte data relating to at least one parameter, wherein the compressed vertex parameter data relating to each parameter comprises a plurality of separate byte blocks of compressed data, each byte block containing data relating to corresponding bytes of the multiple byte data from a plurality of vertices, comprising the steps of:
decompressing each byte block using a decompression algorithm indicated in a header of each byte block to provide decompressed byte blocks; and
reassembling the vertex parameter data by merging together the bytes from the decompressed byte blocks relating to each vertex.

The method of decompression is essentially the reverse of the compression process.

Accordingly, depending on the nature of the compressed data, the method of decompressing may further comprise one or more of the following steps;
a) reading a plurality of byte origin values from the compressed byte data stream;
b) reading difference values from the compressed data, reading an index of byte origins from the compressed data, and adding the difference values to the corresponding byte origins to reconstruct the original byte data;
c) constructing a unique byte table from the compressed byte data stream by reading a control bit which indicates if the subsequent data is a raw byte or a difference value, and adding the difference values to the raw byte origins to form unique byte values;
d) reading an index value from the compressed data and taking the corresponding unique byte table entry as the original byte data; and
e) moving sign bits from the least significant byte to the most significant byte after the step of merging the byte blocks.

In yet a further aspect, the invention provides apparatus for decompressing electronic vertex parameter data in a 3D computer graphics system, the decompressed data relating to each vertex comprising multiple byte data relating to at least one parameter, wherein the compressed vertex parameter data relating to each parameter comprises a plurality of separate byte blocks of compressed data, each byte block containing data relating to corresponding bytes of the multiple byte data from a plurality of vertices, comprising:

decompressing means configured to determine a decompression algorithm for each byte block indicated in a header of each byte block and decompress the byte block using the decompression algorithm to provide decompressed byte blocks; and merging means configured to reassemble the vertex parameter data by merging together the bytes from the decompressed byte blocks relating to each vertex.

The apparatus may further comprise one or more of the following:

a) means for reading a plurality of byte origin values from the compressed byte data stream;

b) means for reading difference values from the compressed data, reading an index of byte origins from the compressed data, and adding the difference values to the corresponding byte origins to reconstruct the original byte data;

c) means for constructing a unique byte table from the compressed byte data stream by reading a control bit which indicates if the subsequent data is a raw byte or a difference value, and adding the difference values to the raw byte origins to form unique byte values;

d) means for reading an index value from the compressed data and taking the corresponding unique byte table entry as the original byte data; and e) means for moving sign bits from the least significant byte to the most significant byte after the step of merging the byte blocks.

Because the vertex parameter data compressed using the algorithms in the invention are fixed size, it is possible to decompress only the parameter data for selected vertices which are required by 3D computer graphics system to render within the local region of a tile. This is a big advantage for tile based render 3D computer graphics system as it saves memory bandwidth by avoiding the need to decompress the whole image.

BRIEF DESCRIPTION OF THE DRAWINGS

Preferred embodiments of the invention will now be described in detail, with reference to the accompanying drawings, in which.

DETAILED DESCRIPTION

Figure 1:
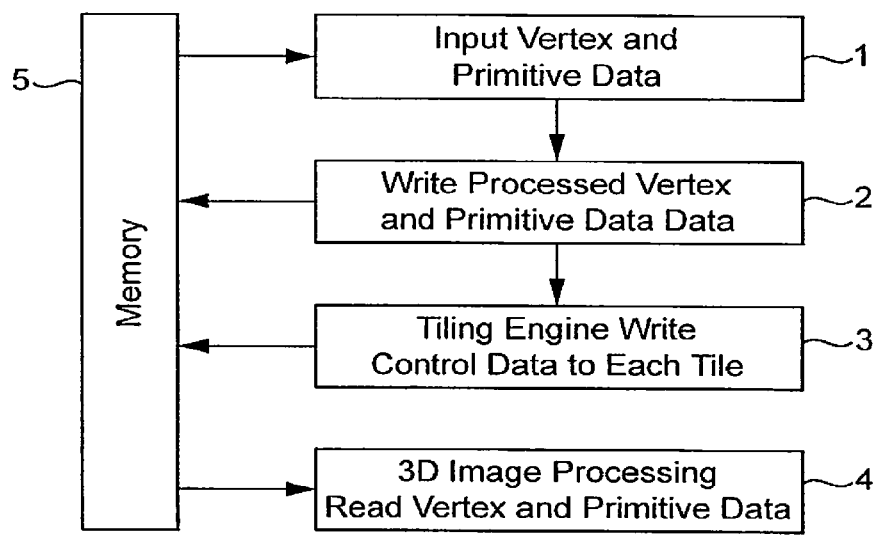
FIG. 1 shows an overview of the main steps performed for tiling in a tile based 3D computer graphics system.
Figure 2:
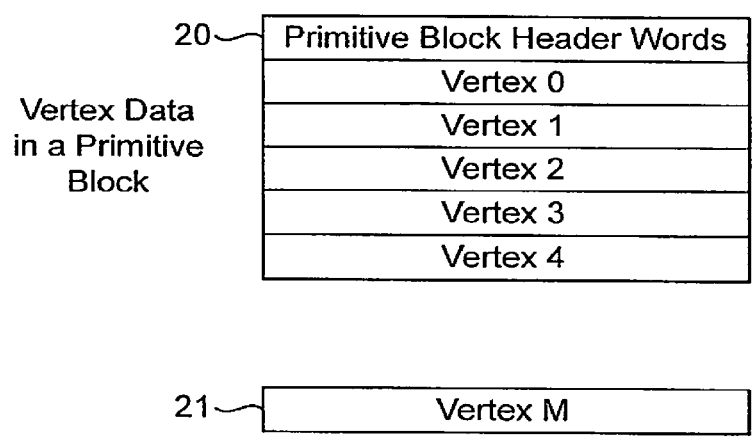
FIG. 2 shows an overview of the data structure of a primitive block in a tile based 3D computer graphics system.
Figure 3:
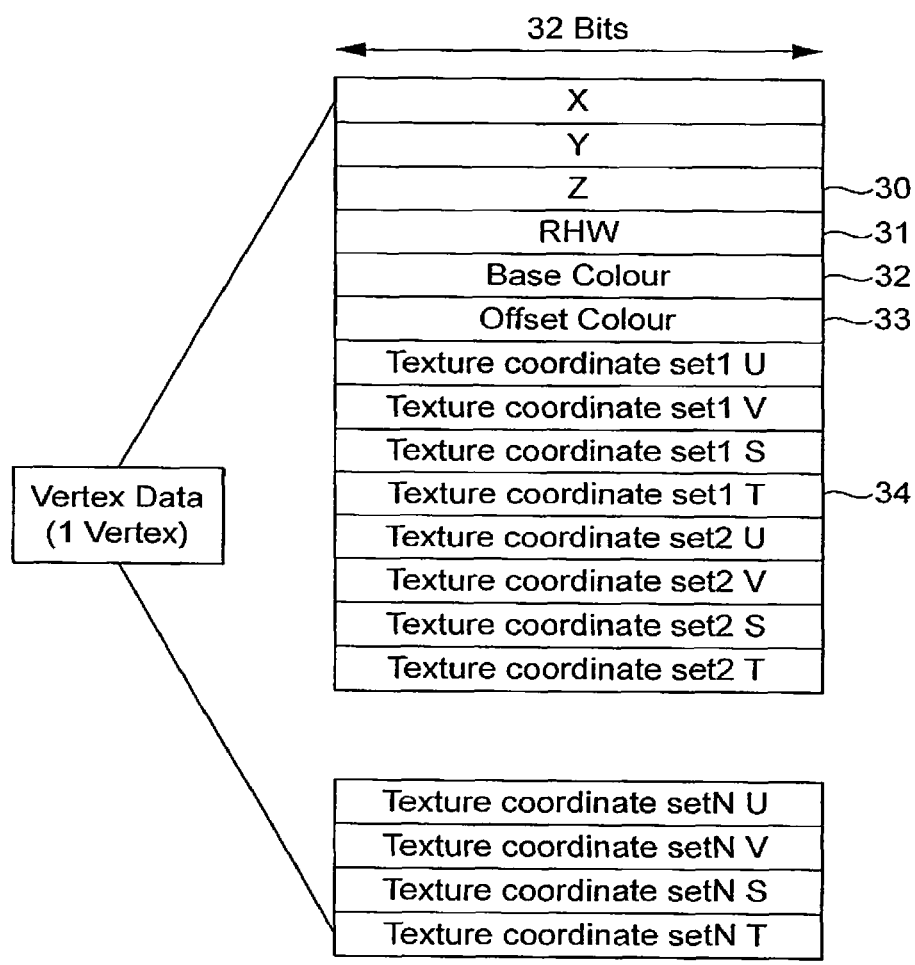
FIG. 3 shows data associated with a vertex used for 3D computer graphics rendering.

The typical data structure for vertex parameter data can be seen in FIG. 3, with X, Y coordinates, Z for depth and RHW used for texturing and shading. There may be several texture coordinate sets, with U, V and S, T as optional.

The values of vertex parameter data for X, Y, Z, RHW and texture coordinates U, V, S and T are in IEEE floating point format. A value of IEEE floating point has 32 bits (4 bytes), with 8 bits for the exponent and 23 bits for the mantissa plus 1 bit for the sign.

Primitives from the application's input data stream are received sequentially in time by a tile based 3D computer graphics system and after pre-processing are grouped into primitive blocks. Therefore the primitives inside a primitive block are mostly from the same triangle mesh. It is unlikely that the data distribution of a vertex parameter data type will be totally random in a primitive block.

From a triangle mesh used by an application for an object being modeled, X and Y coordinate values from the vertices should be within a limited range on the display screen. The depth values Z are normally the results of interpolation of a 3D surface from a model, so they are most likely to be in values with gradual changes between each other. In general, gradual changes between values in vertex parameter data are true for the data used for texturing and shading such as RHW and texture coordinate data.

Because the display resolution of a computer graphics screen is fixed to a fraction of a pixel unit and X and Y coordinates from primitives rendered on screen are within the limited range, reduced accuracy fixed point format can be used for X and Y values from the original floating point values to save parameter data space. Table 1 shows an example of vertex parameter data using 16 bit fixed point format to represent X and Y coordinates in a primitive block with 10 vertices.

TABLE 1

| | Vertex Data from a Primitive Block. | | | | | | |
|---|---|---|---|---|---|---|---|
| Vertex | X and Y | Z | RHW | U | V | S | T |
| 0 | 715B690B | 3F758FB4 | 3D91E402 | BF25A708 | 3F6276E9 | 415E0316 | 418225A2 |
| 1 | 72EE6C1F | 3F76ECC8 | 3D69B094 | BF58DA3B | 3F6276E9 | 41895B47 | 41A401A6 |
| 2 | 747470F7 | 3F748FDF | 3D91D691 | BF25A708 | 3F62FB57 | 415DF274 | 418213F4 |
| 3 | 742D7C00 | 3F76ECE4 | 3D699F55 | BF58DA3B | 3F62FB57 | 418954F6 | 41A3EFF8 |
| 4 | 7737775B | 3F738FB4 | 3D91E402 | 3F25A708 | 3F6276E9 | 415E0316 | 418225A2 |
| 5 | 774C7C00 | 3F74CA8F | 3DCF6776 | BED10AC6 | 3F628536 | 411F0AB4 | 41335B64 |

TABLE 1-continued

Vertex Data from a Primitive Block.

| Vertex | X and Y | Z | RHW | U | V | S | T |
|---|---|---|---|---|---|---|---|
| 6 | 4B246FA9 | 3F76C92D | 3DCFD561 | BED08833 | 3F6276E9 | 411EEC6F | 41331A27 |
| 7 | 487663C6 | 3F718FDF | 3D91D691 | 3F25A708 | 3F62FB57 | 415DF274 | 418213F4 |
| 8 | 4BCC793B | 3F72CB79 | 3DCF1D82 | BED162ED | 3F62FB57 | 411F335F | 41338770 |
| 9 | 49136B31 | 3F6DCA8F | 3DCF6776 | BED10AC6 | 3F628536 | 411F0AB4 | 41335B64 |

In a typical tile based 3D computer graphics system, vertex parameter data are output sequentially for each vertex in a primitive block. This data arrangement makes the vertex parameter data access easier in the 3D rendering stage, especially for tile based rendering where not all the vertices may be needed to render a tile. For the primitive block with 10 vertices shown in Table 1, vertex parameter data are output as "X0, Y0, Z0, RHW0, U0, V0, S0, T0, X1, Y1, Z1, RHW1, U1, V1, S1, T1, . . . X9, Y9, Z9, RHW9, U9, V9, S9, T9".

Due to the high accuracy requirement the vertex parameter data of 32 bit floating point values shown in Table 1 have few 0 byte values. There is no clear pattern in byte data distribution among the 32 bit values for a vertex parameter data component, which is essential for data compression algorithms. For example the data block for vertex Z data from the primitive block shown in Table 1 is: "3F 75 8F B4 3F 76 EC C8 3F 74 8F DF 3F 76 EC E4 3F 73 8F B4 3F 74 CA 8F 3F 76 C9 2D 3F 71 8F DF 3F 72 CB 79 3F 6D CA 8F". The randomness of the data distribution makes it difficult to achieve high compression results for vertex parameter data blocks from 3D computer graphics system.

Byte Blocks

One thing to notice from the data from Table 1 is that for most of the data in a column the most significant bytes MSB are very similar, and are even the same in some cases. The 10 vertices listed in Table 1 have the same MSB on Z, RHW, V, S and T. For the MSB in U there are only three common byte values 0xBF, 0x3F and 0xBE. For the values in a column the data distribution from the least significant byte LSB are quite random.

Figure 4:
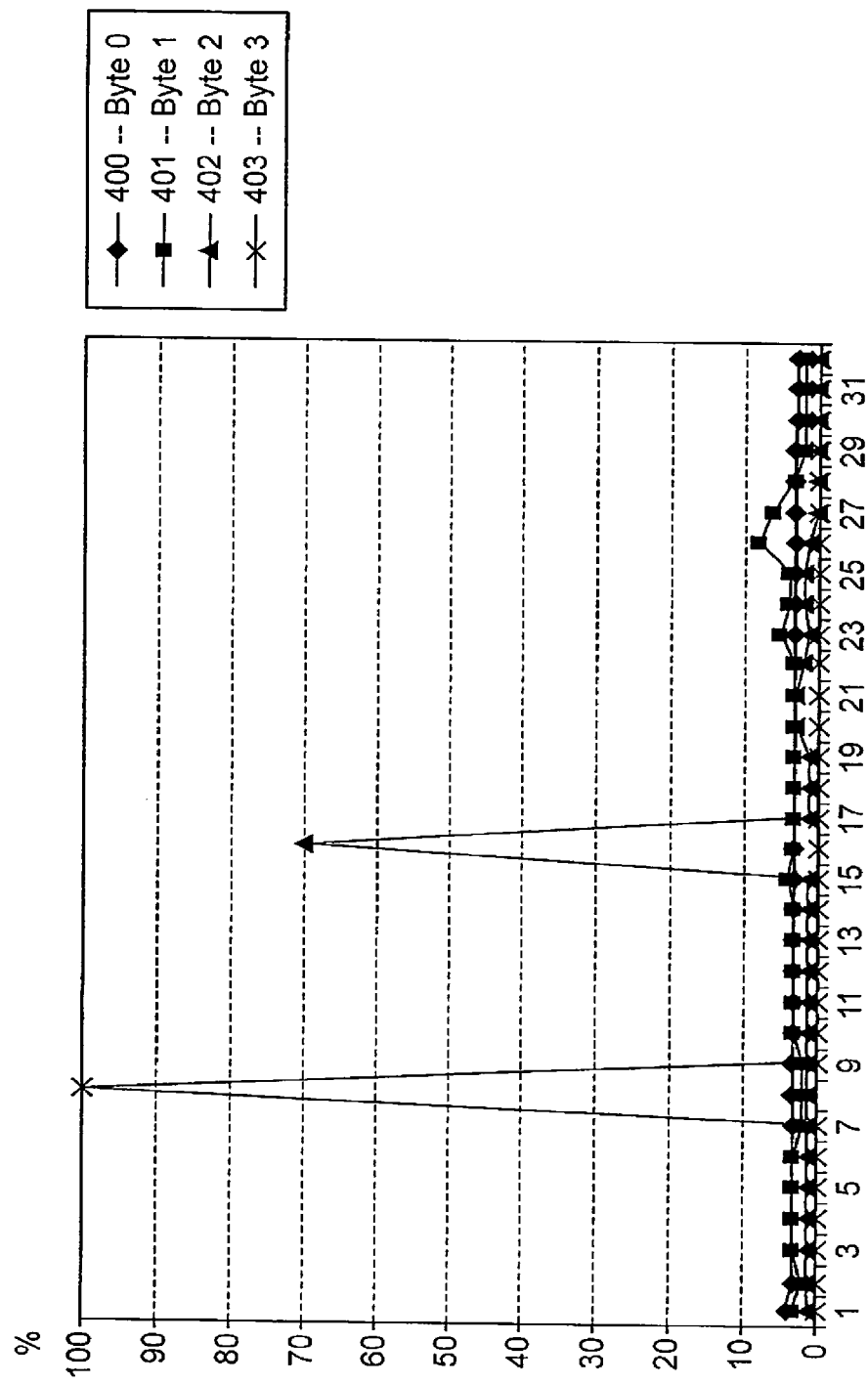
FIG. 4 shows byte data distributions of Z values.

The data distributions for the 4 bytes in the 32 bit IEEE values from the Z data in a render from a 3D computer game are shown in FIG. 4. In FIG. 4 the horizontal axis is the byte value divided by 8 while the vertical axis is the percentage of vertices with the byte value in the same range. Byte 0 is the least significant byte LSB and byte 3 is the most significant byte MSB from a 32 bit value. As shown 403 in FIG. 4 the data distribution of the MSB byte (byte 3) is almost 100% within the range of a byte, which means most of the MSB bytes from the Z values are the same value. The data distribution for byte 2 is shown as 402 in FIG. 4, and has 70% of the byte values within the range of a byte. The data distributions for the least significant bytes byte 1 and byte 0 are very random, as 401 and 400 in FIG. 4.

Figure 5:
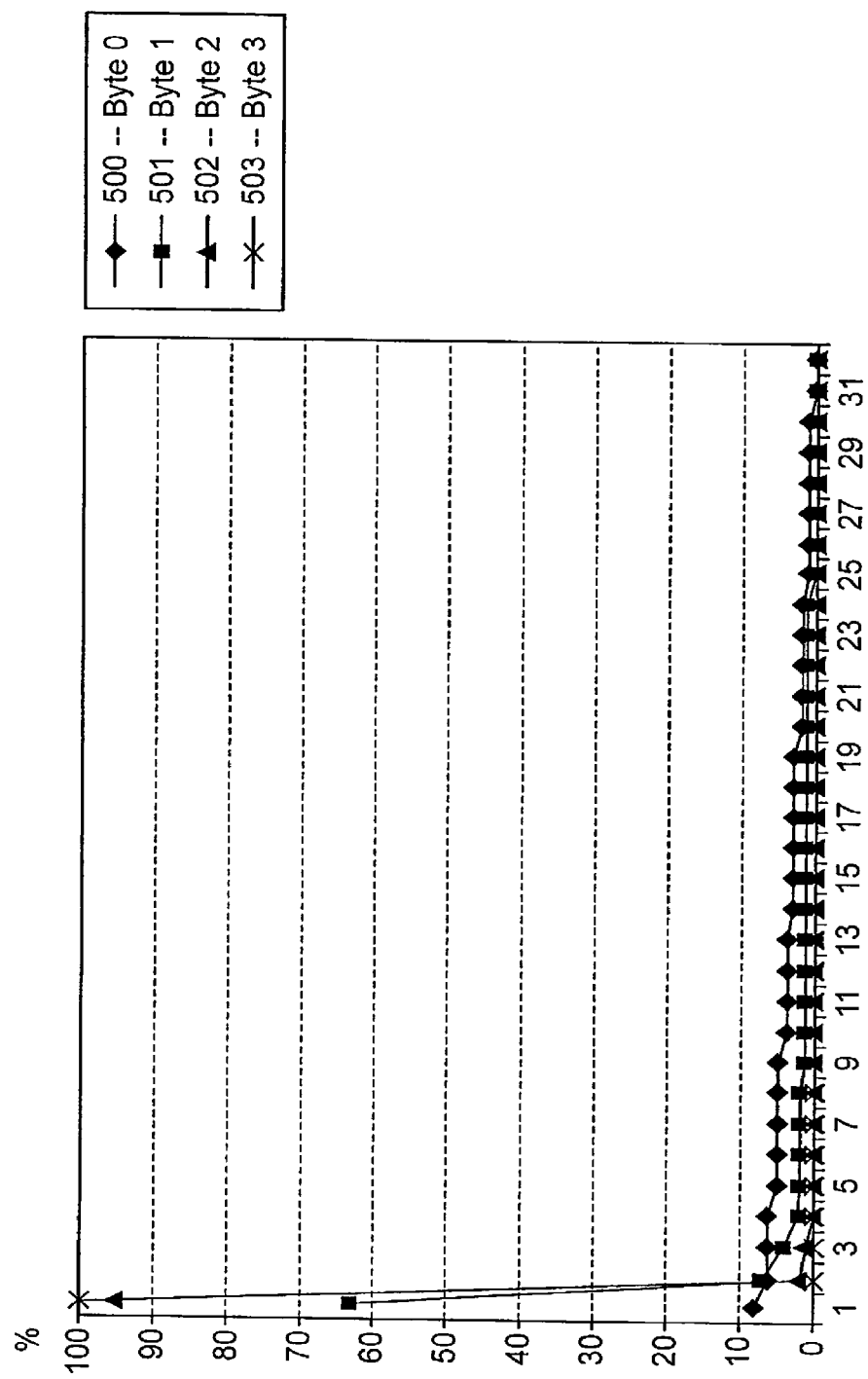
FIG. 5 shows byte delta value distributions of Z values.

In addition the distributions of delta values for each byte are shown in FIG. 5 similarly to FIG. 4. Starting from the second vertex of the primitive block delta values are calculated for each byte, a delta value is the difference between the byte value of a current vertex and the byte value from a previous vertex in the primitive block. The distributions of delta value for byte 3 and byte 2 at 503 and 502 in FIG. 5 have peaks over 90%. For byte 1 there is a peak of 60% in the distribution of delta values, only the distribution of the least significant byte (byte 0) is still very random.

From the vertex parameter data distribution analysis, the most significant bytes are expected to have good compression ratios while the least significant bytes are unlikely to respond well to compression algorithms.

In an embodiment of a first aspect of the present invention, all compression algorithms work on the 4 individual byte data blocks separately for all vertex parameter data components, rather then compressing the whole 32 bit floating point value data block. In this way the compression algorithms are able to take the advantage of the data distribution in the MSB bytes to compress the byte blocks even when the 32 bit floating point data blocks can not be compressed well.

When the vertex parameter data is accessed in 3D processing for rendering each byte is decompressed separately before the original 32 bit vertex parameter data values are reconstructed. Each byte block includes a header word, in which the number of vertices in the block is included.

Byte block based compression is very flexible, it can also be applied to reduced accuracy fixed point value data blocks, for example 16 bit fixed point presentation will have 2 byte blocks and 24 bit presentation will have 3 byte blocks. For floating point values with double precision there are 64 bit and 8 byte blocks.

Moving Sign Bit

An IEEE floating point value has 32 bits with 8 bits for the exponent and 23 bits for the mantissa plus 1 bit for the sign. The sign bit occupies the most significant bit, therefore the most significant byte has 1 leading bit for sign and 7 bits for the exponent. It is easily understandable the MSB byte value will jump by 128 for two floating point values with the same exponent but different signs. As seen the MSB byte of U from vertex 0 and vertex 4 in Table 1, the two values 0xBF25A708 and 0x3F25A708 have the same exponent 0x7E but one is positive value and one is negative value. From the byte data distribution analysis the most significant byte (byte 3) is the most likely byte to be compressed well. Therefore data distribution feature of the exponent values should be preserved from the disturbance of the sign bit in negative values.

An embodiment of a second aspect of the present invention moves the sign bit of a 32 bit floating point value from bit 31 to bit 0 before byte data block compression for vertex parameter data components which may have mixed positive and negative values such as the texture coordinates.

After moving the sign bit the two byte 3 values 0xBF and 0x3F from the above example will become the same 0x7E as shown in Table 2. The maximum distance between the byte values in byte 3 of U values from the 10 vertices in Table 1 is reduced from 128 to 1 as in Table 2, the performance of compression will therefore improve as a result.

TABLE 2

Vertex Data from a Primitive Block after Move Sign Bit of U.

| Vertex | X and Y | Z | RHW | U | V | S | T |
|---|---|---|---|---|---|---|---|
| 0 | 715B690B | 3F758FB4 | 3D91E402 | 7E4B4E11 | 3F6276E9 | 415E0316 | 418225A2 |
| 1 | 72EE6C1F | 3F76ECC8 | 3D69B094 | 7EB1B477 | 3F6276E9 | 41895B47 | 41A401A6 |
| 2 | 747470F7 | 3F748FDF | 3D91D691 | 7E4B4E11 | 3F62FB57 | 415DF274 | 418213F4 |
| 3 | 742D7C00 | 3F76ECE4 | 3D699F55 | 7EB1B477 | 3F62FB57 | 418954F6 | 41A3EFF8 |
| 4 | 7737775B | 3F738FB4 | 3D91E402 | 7E4B4E10 | 3F6276E9 | 415E0316 | 418225A2 |
| 5 | 774C7C00 | 3F74CA8F | 3DCF6776 | 7DA2158D | 3F628536 | 411F0AB4 | 41335B64 |
| 6 | 4B246FA9 | 3F76C92D | 3DCFD561 | 7DA11067 | 3F6276E9 | 411EEC6F | 41331A27 |
| 7 | 487663C6 | 3F718FDF | 3D91D691 | 7E4B4E10 | 3F62FB57 | 415DF274 | 418213F4 |
| 8 | 4BCC793B | 3F72CB79 | 3DCF1D82 | 7DA2C5DB | 3F62FB57 | 411F335F | 41338770 |
| 9 | 49136B31 | 3F6DCA8F | 3DCF6776 | 7DA2158D | 3F628536 | 411F0AB4 | 41335B64 |

The data distribution of the least significant byte is very random and it is not expected to have good compression results, therefore moving the sign bit to the bottom of the LSB byte 0 will not significantly affect the overall compression ratio.

After decompression the sign bit is moved back from bit to bit 31 to reconstruct the original 32 bit floating point value.

The method of moving the sign bit to improve compression performance can be applied to values of other formats which are represented with different number of bytes such as fixed point format and double precision floating point format.

Unique Byte

In an embodiment of a third aspect of the present invention when the byte values from a byte data block are all the same, only one byte is needed in the compression header data together with a bit flag in the compression header to indicate that the compressed byte block is in unique byte format.

It is highly likely that unique byte format can be used in the MSB of some vertex parameter data values. For the 10 vertices listed in Table 2, MSB (byte 3) of Z, RHW, V, S and T are all the same and can be compressed using the unique byte method. In these cases instead of 10 bytes in byte 3 only one byte is output into the compressed data, which is 10% of the original data.

In a preferred embodiment, a current byte value from a vertex parameter data byte block is compared to previous byte values in the byte block for duplicates. If there is no match with any of the previous byte values then the current byte is kept as a common byte. When there is only one common byte value in the byte data block, a unique byte is stored as compressed byte data to replace all the byte data in the byte data block.

On decompression in 3D processing, the unique byte value is used for the byte values of all vertices in the primitive block when a byte data block is in unique byte format. The unique byte method is very efficient for byte data block compression, but it is also limited to the byte data blocks where the byte values are all the same.

Byte Delta Block

In the case where byte values from a byte data block are not all the same, the byte data block cannot be compressed using unique byte format. However, in some cases, byte values from a byte data block are not diverged widely, so the byte values in the byte data block may be within a limited range.

In an embodiment of a fourth aspect of the present invention, a minimum byte value from the byte data block can be used as a byte origin to compress a byte data block with a limited data range using byte delta blocks. For each byte in the byte data block, the delta value (the difference between the byte value and the byte origin value) is output into the compressed byte data block instead of the byte value itself.

The number of bits needed for the delta values depends on the range of byte values in the byte data block. In a preferred embodiment the minimum byte value is kept in the compression header as the byte origin. All delta values in byte delta blocks will be positive values therefore there is no need for a sign bit.

The range of byte values are fixed to [0, 255] for the 8 bits. If the range of delta values from a byte data block can be represented using fewer than 8 bits then the byte data block can be compressed with byte delta block algorithm.

The number of bits needed to represent delta values in a byte block is shown in Table 3.

TABLE 3

Number of Bits Needed for Delta Ranges

| Delta Range | Delta Bits |
|---|---|
| [0, 1] | 1 |
| [2, 3] | 2 |
| [4, 7} | 3 |
| [8, 15] | 4 |
| [16, 31] | 5 |
| [32, 63] | 6 |
| [64, 127] | 7 |

In a preferred embodiment the number of bits for delta values is stored in the compression header together with the 8 bit byte origin value. The delta values for each byte from the byte data block are output as compressed data with a fixed number of bits. The compressed byte delta block of byte data values from vertices in the primitive block can be easily decompressed by adding the delta value to the byte origin value to reconstruct the original byte value.

Taking byte 3 from the 32 bit values of U for the 10 vertices in Table 2 as an example:

Byte 3 after moving the sign bit are: "0x7E, 0x7E, 0x7E, 0x7E, 0x7E, 0x7D, 0x7D, 0x7E, 0x7D, 0x7D".

The byte data block of byte 3 cannot be compressed using the unique byte method. There are two common byte values as 0x7E and 0x7D.

The minimum byte value is 0x7D, the maximum byte value is 0x7E. The distance between the maximum and minimum values is 1, which can be represented using a 1 bit delta value.

The compressed data are:

Byte origin: "7D", 8 bits.

Compressed byte delta block is 1 bit for each byte for the 10 vertices in the primitive block:

"1111100100", 10 bits.

The total compressed data include byte origin and byte delta block are 18 bits, which is 22.5% of the original 80 bits for the byte block.

On decompression it is known from the compression header that byte 3 of U is in delta block compression format, the number of bits for delta block is 1 bit per byte. The byte origin of 8 bits is also read from the compression header data.

For each byte in the block for byte 3 from a vertex U value accessed in 3D processing, the 1 bit delta value is read from the compressed delta block. The delta value is added to the origin byte to reconstruct the original byte data.

The algorithms described in prior art schemes compressing vertex parameter data use the delta values for the whole values between the vertex parameter data and the parameter data from the vertex origin. The delta values from a vertex parameter component of 32 bits floating point format are often in a much larger range, and an integer representation of delta for floating point values may need many bits therefore reducing the performance of compression. Fixed point format representation could be used for the delta values in the compression, but this increases the complexity of the compression and decompression algorithms.

The byte delta block algorithm in the present invention is based on individual byte data blocks, which is different from the algorithms described in the prior art. For byte data blocks the chance of being represented using byte delta blocks are increased enormously, as can been seen in FIG. 5. Over 90 percent of the delta values are within the range of [0, 7] for the MSB bytes 3 and 2. Even byte 1 has 60 percent of the delta values within the range of [0, 7]. An improvement of compression performance using the byte delta block algorithm presented arises over the algorithms described in the prior art. The compression and decompression operations of the byte delta block algorithm are only integer addition and subtractions within 8 bit integer representation, therefore the algorithm is very fast and efficient and easy to be implement in computer hardware. The algorithm is suitable to be used for vertex parameter data compression in 3D computer graphics system, especially tile based 3D computer graphics system.

Byte Delta Block with Multiple Origins

Looking at byte 1 values for V from the 10 vertices in Table 2 are: "0x76, 0x76, 0xFB, 0xFB, 0x76, 0x85, 0x76, 0xFB, 0xFB, 0x85".

There are three common byte values as 0x76, 0xFB and 0x85. The distance between the maximum byte 0xFB and minimum byte 0x76 in the three common bytes is 0x85, which can only be represented as an 8 bit integer. In this case byte 1 cannot be compressed using the delta block algorithm.

Under further analysis of the three common byte values the distance between 0x76 and 0x85 is 0xF, which can be represented using a 4 bit delta value. Therefore the whole byte data block can be represented using 4 bit delta values in two separate ranges.

In an embodiment of a fifth aspect of the present invention, byte data block data can be compressed using delta block with multiple byte origins.

The byte origins of the two ranges from the above example are 0x76 and 0xFB. One extra bit is needed for each compressed byte to indicate which origin the delta value is based on. The compressed data for byte 1 will be:

Two origins: "76FB", 16 bits.

Compressed delta block data of 5 bits per vertex with 4 bits delta values and 1 bit for byte origin index are 50 bits for the 10 vertices.

Byte 1 compressed data for the 10 vertices in the primitive block: "0000 0, 0000 0, 0000 1, 0000 1, 0000 0, 1111 0, 0000 0, 0000 1, 0000 1, 1111 0", 50 bits.

The total compressed output data including byte origins and byte index block data are 66 bits, which is 82.5% of the original 80 bits for the byte data block.

On decompression it is known from the compression header that byte 1 of V is in delta block compression format, the number of byte origins are 2, the number of bits for delta block is 4 bits per byte. The byte origins of 8 bits each are also read from the compression header data.

For each byte 1 from vertex V value accessed in 3D processing, the 1 bit byte origin index is read first, followed by the 4 bit delta value from the compressed delta block. The delta value is added to the byte origin indicated by the byte origin index to reconstruct the original byte data.

As another example a byte data block from 20 vertices are: "0x03, 0x5B, 0x03, 0x54, 0xF2, 0x54, 0x03, 0x0A, 0x5B, 0x5B, 0x03, 0xF2, 0xEC, 0x0A, 0xF2, 0x0A, 0x0A, 0x33, 0x0A, 0x03".

There are seven common byte values as 0x03, 0x5B, 0x54, 0xF2, 0x0A, 0xEC and 0x33. The distance between the maximum byte 0xF2 and minimum byte 0x03 in the seven common bytes is 0xEF, which can only be represented as an 8 bit integer. In this case the byte block cannot be compressed using delta block algorithm with one byte origin.

The distance between the maximum byte 0xF2 and byte 0x54 in the seven common bytes is 0x9E, which can only be represented as an 8 bits integer. The distance between the byte 0x5B and minimum byte 0x03 in the seven common byte is 0x58, which can only be represented in 7 bit integer. Consider 1 extra bit is needed for the index of byte origins, the byte block cannot be compressed by a delta block algorithm with 2 byte origins.

Under further analysis of the seven common byte values the distance between 0x03 and 0x0A is 0x7, which can be represented using a 3 bit delta value. The distance between 0x5B and 0x54 is also 0x7, while the distance between 0xF2 and 0xEC is 0x6. Therefore the whole byte data block can be represented using 3 bit delta values in four separate ranges.

The byte origins of the four ranges from the above example are 0x03, 0x54, 0xEC and 0x33. Two extra bits are needed for each compressed byte to indicate which origin the delta value is based on. The compressed data for the byte data block will be:

Four byte origins: "0354EC33", 32 bits.

Compressed delta block of 5 bits per vertex with 3 bit delta values and 2 bits for the byte origin index are 100 bits for the 20 vertices.

Compressed byte data for the 20 vertices in the primitive block: "000 00, 111 01, 000 00, 000 01, 110 10, 000 01, 000 00, 111 00, 111 01, 111 01, 000 00, 110 10, 000 10, 111 00, 110 10, 111 00, 111 00, 000 11, 111 00, 000 00", 100 bits.

The total compressed output data including byte origins and byte index block are 132 bits, which is 82.5% of the original 160 bits for the byte block.

On decompression it is known from the compression header that the byte data block is in delta block compression format, the number of byte origins are 4, the number of bits for the delta block is 3 bits per byte. The byte origins of 8 bits each are also read from the compression header data.

For each byte from the 20 vertex values accessed in 3D processing, the 2 bit byte origin index is read first, followed by the 3 bit delta value from the compressed delta block. The delta value is added to the byte origin indicated by the byte origin index to reconstruct the original byte data.

The compression ratio of delta block algorithm depends on the number of bits needed to represent the delta values of byte data block. When the distance of the maximum and minimum bytes values cannot be represented in less than 8 bits with multiple byte origins, the byte block cannot be compressed by delta block algorithm.

Ranges of the Byte Values

In order to compress the byte data block with a delta block algorithm, the ranges of byte values in the primitive block need to be known. When the ranges of the byte values can be represented using less than 8 bits delta values then the delta block algorithm can be used.

The ideal way to work out the ranges of the byte values is to sort all the byte values into an ascending or descending order. If the delta value between the maximum and the minimum byte value is less than 8 bits then use delta block compression with 1 origin. Otherwise divide the whole range into multiple sub ranges with equal distances between the maximum and minimum values. If the byte data ranges can be represented with fewer than 8 bits including delta values and byte origin index then the byte data block can be compressed using delta block compression with multiple byte origins.

The storage space for the byte data values of the whole byte block is needed to sort the byte values from the byte data block. This will add extra cost if implemented in computer hardware.

In an embodiment of a sixth aspect of the present invention, a method of deriving multiple byte value ranges from a byte data block without sorting the byte data and using no extra storage is described as below.

As the byte data come from the input vertex parameter data in a primitive block, the range of byte values is stored using minimum and maximum byte values and the number of bits needed for delta values in the range. A new byte from the input vertex parameter data block is checked against the existing range to decide if the byte is inside the range or not. If the byte is outside the existing range then the range is updated by replacing either the minimum or the maximum value of the range, and also updating the number of bits needed for delta values in the range.

When the new byte value expands the number of bits for delta values in the byte range to more than a pre defined maximum number of bits, for example 5 bits, a new range is added to keep the delta values of the first range within the maximum number bits. The following bytes will be checked against the 2 ranges using the same method as described before. The process continues until the number of ranges reaches the limit of the number of byte origins, for example 4 byte origins have 4 byte ranges. If the byte data block can be represented with the pre defined maximum number of bits for delta values in the byte ranges then the byte data block can be compressed using the delta block algorithm.

Merge the Ranges of the Byte Values

When there are 2 or more ranges for a byte data block within the pre defined maximum number of delta bits at the end of the evaluation process, there is still the possibility that the ranges can be merged together. For example if there are 2 ranges with 6 bits of delta values, they may be merged into 1 range with 7 bits delta. In this case 7 bits are needed for the one origin case instead of 6 bits delta plus 1 byte origin index are needed for the two byte origins case. The compressed delta block size is the same, but there is a saving of 8 bits for the second byte origin in the later case so it is preferred to merge the ranges together if possible at the end.

The byte delta block algorithm is a simple fast and efficient compression algorithm for vertex parameter data compression in 3D computer graphics, especially for tile based 3D computer graphics system. By using the byte range evaluation method described the ranges of byte data block can be easily worked out as the input vertex parameter data arrive. The method can be implemented in a 3D computer graphics hardware pipeline without the need for a large data store to sort the byte data blocks. The compression and decompression operations can be performed efficiently on vertex parameter data and other kinds of byte data blocks.

The size of compressed vertex data using the byte delta block algorithm of the present invention is a fixed number of bits per byte, which include the fixed number of bits for delta values, and the fixed number of bits for byte origin index. The other advantage of the byte delta block algorithm is that the compressed vertex parameter data can be accessed randomly from compressed data block in 3D processing. Because the compressed vertex parameter data is fixed in size, the location of compressed parameter data of a vertex can be easily calculated. Therefore there is no need to decompress the vertex parameter data for the whole primitive block each time, only the vertex parameter data needed for rendering a tile are read from the compressed data block and decompressed.

Common Byte Table

Because of the diverse nature of the byte values from some of the vertex parameter data block, not all of the data blocks can be compressed using unique byte or byte delta block algorithms.

As an example the byte values from 10 vertices in a primitive block are: "0x03, 0x5B, 0xF2, 0x5B, 0x03, 0x03, 0xEC, 0xF2, 0x33, 0x03". The distance between the maximum byte 0xF2 and byte 0x5B in the common bytes is 0x97, which can only be represented as an 8 bit integer. The distance between the byte 0x5B and minimum byte 0x03 in the common bytes is 0x58, which can only been represented as a 7 bit integer. One extra bit is needed for the index of byte origins. The byte block can only be compressed by the delta block algorithm with 4 byte origins 0x03, 0x5B, 0xEC and 0x33. Three bits of delta values are needed to represent the distance 0x6 between 0xF2 and 0xEC, and two extra bits are needed for the byte origin index. The compressed data size is 4×8 bits byte origins plus 10×(3+2) bits of compressed data and 82 bits in total. Therefore the byte data block cannot be compressed using the byte delta block algorithm.

A common byte table can be used to store the common byte values when the number of common bytes is limited. In an embodiment of a seventh aspect of the present invention common byte values from a byte data block can be kept in a common byte table. For each byte in the byte data block an index to the common byte table is output into the compressed byte data block instead of the byte value itself in order to compress the byte data block.

The number of bits needed for the table index depends on the number of entries in the common byte table. If the number of entries in the common byte table is stored in the compression header, then the data size of the common byte table and the number of bits needed for the table index can be easily worked out on decompression for a primitive block.

As an example for the above byte data block: "0x03, 0x5B, 0xF2, 0x5B, 0x03, 0x03, 0xEC, 0xF2, 0x33, 0x03". The byte block has five common byte values 0x03, 0x5B, 0xF2, 0xEC and 0x33. The five common byte values can been stored in a common byte table for the byte data block, and for compressed byte data in each vertex an index of 3 bits to the common byte table is output.

Byte table: "035BF2EC33, 40 bits.

Compressed byte data for the 10 vertices in the primitive block: "000 001 010 001 000 000 011 010 100 000", 30 bits.

The total compressed output data include common byte table and byte index block are 70 bits, which is 87.5% of the original 80 bits for the byte block.

On decompression it is known from the compression header that the byte data block is in common byte table format, the number of entries in the common byte table is 5. The byte values of the common byte table are read first from compression header to form the common byte table.

For each vertex data accessed in 3D processing, the 3 bit table index is read from the compressed data blocks. The table index is then used to look up the byte value in the common byte table for the original byte data in the primitive block.

The compression ratio of the common byte table depends on the number of common byte values from the byte data block. The number of common byte values determines the common byte table size and the number of bits for the table index. In a preferred embodiment the maximum entries of common byte table can be predefined, for example 16 or 32, therefore the maximum number of bits for table index is 4 or 5 respectively.

The total compressed data size is the common byte table size and the table index for each byte in the vertex parameter data byte block. When the number of common byte values from the byte data block is big, the data size of the common byte table and the table index for the vertices may be more than the original data size of the byte data block. In this case the byte data block cannot be compressed by common byte table algorithm.

Common Byte Delta Table

The compressed data size of the common byte table algorithm depends on the size of the common byte table. The number of entries in the common byte table is decided by the number of common byte values from the byte data block, which cannot be changed. The only way to reduce the common byte table size is to use an alternative representation method for the common byte table.

As an example, byte values from a byte data block in the primitive block with 10 vertices are: "0x35, 0x5B, 0x99, 0x35, 0x04, 0xD2, 0xD2, 0x5B, 0x35, 0x37".

There are 6 common byte values: 0x35, 0x5B, 0x99, 0x04, 0xD2 and 0x37. The common bytes can be arranged in 3 ranges as [0x04, 0x37], [0x5B, 0x5B] and [0x99, 0xD2] with 6 bits delta values in the ranges. Two bits are needed for the three byte origins per vertex, which make the byte data block unsuitable for the byte delta block algorithm.

To use the common byte table algorithm the data size for the common byte table will be 48 bits, and 3 bits for the table index in each vertex. The total data size will be 78 bits, which is almost the same as the original data size 80 bits (97.5%).

It can be seen under close investigation that although the common byte values are mostly different, the byte values are almost evenly distributed in the whole range of [0x04, 0xD2]. As the number of bytes in the common byte table is very limited in number, the byte values in the common byte table can be sorted easily into ascending order.

After sorting, the common byte values in the above example become as: "0x04, 0x35, 0x37, 0x5B, 0x99, 0xD2". A common byte delta table can be formed as "0x04, 0x31, 0x02, 0x24, 0x3E, 0x39", with the first entry 0x04 as 8 bits raw byte value and the rest as delta values to the byte delta table and 30 bits table index for the 10 vertices, which is 85% of the original 80 bits of data for the byte data block.

In an embodiment of an eighth aspect of the present invention the common byte values can be sorted into ascending order to form a common byte delta table including a starting 8 bit raw byte value and delta values with a fixed number of bits.

In a preferred embodiment the common byte values from a byte data block are sorted first, then the number of bits needed for delta values is derived by looking up the distance values to the values in Table 3. The common byte table is replaced with the common byte delta table if the size is smaller than the 8 bits per entry in the common byte table.

On compression the number of entries in the common byte delta table is stored in the compression header, together with the number of bits used for delta values. The entries in the common byte delta table are stored as a leading 8 bit byte value followed by a delta value with a fixed number of bits.

On decompression it is known from the compression header that a byte data block is in common byte delta table format. The number of entries in the common byte delta table and the number of bits for the delta values are read from the compression header first. The delta values in the common byte delta table are read back to reconstruct the common byte table with the original 8 bit byte value entries.

The number of bits used for the common byte delta table index in each vertex is known from the number of entries in the common byte table. The table index for the vertex parameter byte data of a vertex can be read from the compressed byte data block to look up the original byte value from the reconstructed common byte table.

For the byte data block in the above example the number of entries in the byte delta tables is 6, and the number of bits for delta values in the common byte delta table is 6. The number of bits used for the table index can be easily worked out from the number of table entries, which is 3 bits in this case.

To reconstruct the common byte table on decompression the first byte value from the common byte delta table is read first as 0x04. Next a 6 bit delta value is fetched as 0x31 and added to the byte value 0x04, so the original byte 0x35 is reconstructed. Another delta value 0x02 is added to the previous byte 0x35 to form the original byte 0x37. Subsequently all delta values from the common byte delta table are used to reconstruct the original byte values by adding the delta value to the previous byte. The entire common byte table is reconstructed as "0x04, 0x35, 0x37, 0x5B, 0x99, 0xD2" at the end.

For each vertex accessed in 3D processing, the 3 bit table index value for the vertex parameter byte data block is read from the compressed data block. The table index is then used to look up the original byte value in the common byte table to reconstruct the vertex parameter byte data in the primitive block.

Common Byte Delta Table with Control Code

In an embodiment of a ninth aspect of the present invention, a 1 bit control code can be introduced in the common byte delta table to allow a mixture of delta values and raw byte values in the common byte delta table. There is a 1 bit control code for each entry in the common byte delta table to indicate if the entry is a delta value or a raw byte value, for example 0 for raw bytes and 1 for delta values. Because the first entry in the common byte delta table is always a raw byte value, there is no need for the control code bit in the first entry.

The mixture of delta values and raw byte values in the common delta byte table is a useful feature to reduce the common byte table size when the distance between two common byte values from the table is too big to be represented with fewer than an 8 bit delta value.

As an example a vertex parameter byte data block from a primitive block with 32 vertices are: "0x03, 0x6B, 0x03, 0x47, 0x07, 0xF2, 0xF1, 0xF2, 0x47, 0x03, 0x0A, 0x03, 0x0A, 0x6B, 0x6B, 0x47, 0x03, 0x0A, 0xF2, 0xF2, 0xEC, 0xEC, 0xED, 0x0A, 0xF2, 0x0A, 0x03, 0x0A, 0x33, 0x0A, 0x03, 0x03".

There are ten common byte values as 0x03, 0x6B, 0x47, 0x07, 0xF2, 0xF1, 0x0A, 0xEC, 0xED and 0x33. The common bytes can be arranged in 3 ranges as [0x03, 0x33], [0x47, 0x6B] and [0xEC, 0xF2] with 6 bit delta values as the ranges. Two bits are needed for the three byte origins per vertex, which makes the byte data block unsuitable for byte delta block compression.

To use the common byte table algorithm the data size for the byte table will be 80 bits, and 4 bits for the table index in each vertex. The total data size will be 80+4×32=208 bits, which is 81.25% of the original data size of 256 bits.

After sorting the common byte values are: 0x03, 0x07, 0x0A, 0x33, 0x47, 0x6B, 0xEC, 0xED, 0xF1, 0xF2". The delta block of the common byte values are: "0x03, 0x04, 0x03, 0x29, 0x14, 0x24, 0x81, 0x01, 0x04, 0x01". As can be seen the distance between byte value 0x6B and 0xEC is 0x81, which is too big to be represented with a delta value which has less than 8 bits. Therefore the byte data block cannot be compressed with the common byte delta table algorithm.

By applying the algorithm of mixing delta values with raw byte values using a control code to the common byte values in the common byte table, the byte values with big delta 0x33, 0x47, 0x6B and 0xEC can be represented in raw bytes, the same as the first byte 0x03. The rest of the bytes can be represented using 3 bit delta values.

The common byte delta table with a control bit for raw bytes become: "03, 1 4, 1 3, 0 33, 0 47, 0 6B, 0 EC, 1 1, 1 4, 1 1.

The mixed common byte delta table output consists of 5 raw byte 0x03, 0x33, 0x47, 0x6B and 0xEC. There are also 5 delta values 4, 3, 1, 4 and 1 with 3 bits each, plus 9 bits of control bits for all the entries in the table except the first one. The total compressed data size is 5×8+5×3+9=64 bits for the common byte delta table with control code. Adding the 128 bits for the table index of the 32 vertices, the total compressed byte data size is 192 bits, which is 75% of the original byte data size 256 bits. Comparing with the common byte table algorithm there is a 6.25% increase in compression ratio by using a control code to mix the raw byte values with delta values in the common byte delta table for the byte data block from the above example.

In a preferred embodiment the number of entries in the common byte delta table for a byte data block is stored in the compression header, together with the number of bits used for delta values on compression. For the byte data block in the above example the number of entries in the common byte delta table is 10 and the number of bits for delta values is 3 bits. There is also a 1 bit flag in the compression header to indicate that the common byte delta table is mixed with raw byte values.

On decompression it is known from the compression header that the byte data block is in common byte delta table format, the number of entries in the common byte delta tables is 10 and the number of bits for delta is 3. It is also known from the compression header that the common byte delta table is a mixture of delta values with raw byte values with a control bit for each table entry except the first one. The number of bits used for the table index can be easily worked out from the number of table entries, which is a 4 bit table index per vertex.

To reconstruct the common byte table the first byte value of the byte delta table is read, as 0x03 in the above example. Then the 1 bit control code is read to decide if the next value is an 8 bit raw byte, or a 3 bit delta value. In a preferred embodiment the control code 0 means a raw byte and control code 1 means a delta value. In the case of a delta value, it is added to the previous byte value to form the original byte as the common byte table entry.

For each vertex data accessed in 3D processing from the primitive block in the above example, the 3 bit table index for the vertex parameter byte data block is read from the compressed byte data blocks, it is then used to look up the original byte value in the primitive block from the reconstructed common byte table.

As described before the number of bits for the common byte table index is a fixed number related to the number of entries in the common byte table. The compressed vertex parameter byte data for a vertex in a primitive block can be accessed by calculating the location of the compressed byte data for the vertex in the compressed byte data block.

The common byte table algorithm is an efficient compression algorithm to compress vertex parameter byte data blocks, especially when the data distribution is too divergent to be compressed using unique byte and byte delta block algorithms. Extended with the methods of common byte delta table and control code to mix delta values with raw bytes, the common byte table algorithm presented has the advantage of an optimized common byte table with a small size over existing data compression algorithms. The performance of the common byte table algorithm is enhanced.

In a particular embodiment, the compression process is performed in two passes. In the first pass the input vertex parameter byte data blocks from a primitive block are read to gather statistic data of the byte data blocks such as the number of common bytes and the ranges of the byte values in the input byte data block. The first byte from the byte data block is stored as the first entry in the common byte table. From the second byte of the byte data block onwards, when each byte data comes in to the compression unit, it is compared with the byte values in the common byte table. If no match found for the byte data from the common byte table, the byte value is added to the common byte table as a new entry.

At the same time the range of byte values is stored using minimum and maximum byte values and the number of bits needed for delta values in the range. From the second byte onwards every byte from the input vertex parameter data block is checked against the existing range to decide if the byte is inside the range or not. If the byte is outside the existing range then the range is updated by replace either the minimum or the maximum value of the range, and also updating the number of bits needed for delta values in the range as described earlier.

At the end of the first pass as all byte data are read from the input byte data block, the number of common bytes is known, as well as the entries in the common byte table. The ranges of byte values are also known after the first pass, together with the number of bits needed to represent the delta values within the byte value ranges. All the statistic information is formed for the byte data block compression in the second pass.

Figure 6:
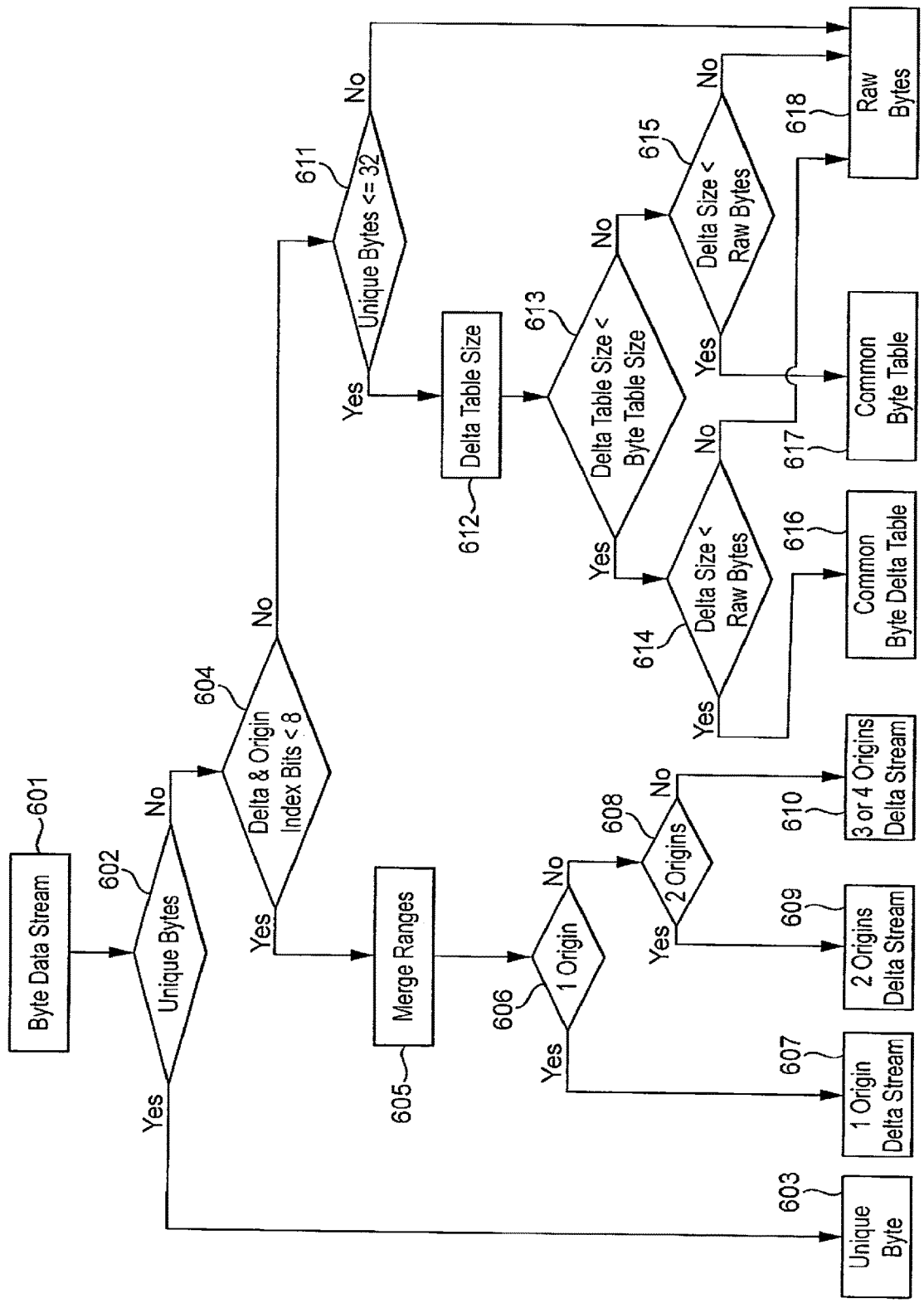
FIG. 6 shows an overview of a preferred embodiment of a byte block compression unit.

In a particular embodiment, the compression unit for vertex parameter byte data blocks in a 3D computer graphics system is shown in FIG. 6. The byte data block 601 from a vertex parameter data in a primitive block is input to a compression unit of the 3D computer graphics system. The input vertex parameter data block can be stored after the first pass of gathering statistic data, or can be read again to avoid the additional storage area in the hardware implementation.

The number of common bytes is checked for the input byte data block, as 602 in FIG. 6. Unique byte algorithm 603 is used to compress the byte data block if there is only one unique byte value in the byte data block. For the case when there are more than one common byte values in the byte data block, a check is made of the byte values ranges generated in the first pass for the possibility to represent the byte values using delta values with a limited number of bits in the ranges 604. If the number of bits for delta values and the number of bits for the byte origin index is fewer than 8 bits then the byte data block can be compressed using the byte delta block algorithm. Before compressing into byte delta block data, the ranges of the byte data block are examined for possible merging of the ranges 605 to obtain an optimized representation. After merging ranges the byte data block is compressed with one byte origin 607 or with multiple byte origins, usually up to 4 byte origins 608, 609 and 610.

When the byte data block cannot be compressed using either the unique byte or byte delta block algorithms, the number of common bytes is checked against a predefined value of a maximum number of entries in the common byte table generated in the first pass. In a preferred embodiment when the number of common bytes is not more than 32, a common byte table compression algorithm is applied on the byte data block at 611 in FIG. 6.

The number of bits needed for the table index of a byte data block is dependent on the number of entries in the common byte table, which is a fixed number for a byte data block. The compression ratio depends on the number of bits needed for the table index and the size of the common byte table. The size of common byte table is the number of entries multiply by 8 bits. The size of the common byte delta table is calculated from the common byte values in the common byte table generated in the first pass using the number of bits for delta values in the delta table 612 in FIG. 6. The 1 bit control code is used when it is necessary to reduce the common byte delta table size to a minimum. When the delta table size is less than the size of the raw byte table, the common byte delta table algorithm 614 is used for compression. Otherwise the common byte table algorithm 615 is used to compress the byte data block.

If the total compressed data size including common byte delta table size and table index for all vertices in the primitive block is less than the original size of the byte data block, the byte data block is compressed using the common byte delta table algorithm 616. Otherwise the byte data block is uncompressed and output as raw byte data block 618. Similarly if the total compressed data size including common byte table size and table index for all vertices in the primitive block is less than the original size of the byte data block, the byte data block is compressed using the common byte table algorithm 617. Otherwise the byte data block is uncompressed and output as raw byte data block 618.

The byte data block is output as a raw byte data block 618 when the number of common byte values is more than a predefined threshold value, as 32 in the particular embodiment 611.

Compressed Vertex Parameter Data Structure

As described before, the compressed vertex parameter data consists of two parts: compression header data and compressed vertex data. The compression header data for each vertex parameter byte data block includes compression format, unique byte value, byte origin values and data for common byte table or common byte delta table. The compressed vertex data are in a fixed size for each vertex depending on the compression format for the byte data block.

The compressed vertex parameter data structure for the compression algorithms in the invention are listed in Table 4.

TABLE 4

Compression Formats and Compressed Data Size

| Value | Compression Format | Compression Header Data Bits | Compressed Vertex Data Bits |
|---|---|---|---|
| 0 | Raw Byte | 0 | 8 |
| 1 | Unique Byte | 8 | 0 |
| 2 | Delta Block | 2 bits number of byte origins + number of origins * 8 + 3 bits number of delta bits | Delta bits + Byte origin index bits |
| 3 | Common Byte Table | 4 bits number of table entries + number of table entries * 8 | Table index bits |
| 4 | Common Byte Delta Table | 4 bits number of table entries + 2 bits number of delta bits + 1 bit control bit present + delta table size | Table index bits |

After compression the compression format for a byte data block is written in the compression header data by the compression unit, together with the other compression header data as listed in Table 4. The compressed vertex parameter data, as listed in Table 4 for each compression format, are output into a separate compressed vertex data block.

When the vertex parameter data are needed in 3D processing for a triangle in a primitive block, the compression format is read first from the compression header data for each byte of the vertex parameter data. Additional header data may be read according to the compression format, as shown in Table 4.

When a byte data block is in raw byte format, there is no additional data from the compression header, 8 bit byte data for each vertex are output in the compressed vertex data block. On decompression the 8 bit byte data is read when the byte of vertex parameter data is needed.

When a byte data block is in unique byte format, the 8 bit unique byte value is output in the compression header, there is no output in the compressed vertex data block because all byte values are the same as the unique byte value in the compression header. On decompression the 8 bit unique byte data is used as vertex parameter byte data for all vertices in the primitive block.

When a byte data block is in delta block format, there are additional data in the compression header for the number of byte origins, the byte origin values and the number of bits for delta values. The delta values for each byte of the vertex parameter data are output in the compressed vertex data block. In the case of multiple byte origins, the byte origin index is also output in the compressed vertex data block. The delta values and byte origin index values are in the fixed number of bits for all vertices in a primitive block as indicated in the compression header. On decompression the number of byte origins and the number of delta bits are read from the compression header, together with the byte origin values. For each vertex parameter byte data accessed in 3D rendering the fix sized delta value is read from the compressed vertex parameter byte data block. For the multiple byte origin case the byte origin index value is also read for the vertex from the compressed vertex parameter byte data block. The delta value is added to the byte origin value indicated by the byte origin index to reconstruct the original byte data.

When a byte data block is in common byte table format, there are additional data in the compression header for the number of entries and the byte values in the common byte table. The table index values for each byte of the vertex parameter data are output in the compressed vertex data block as shown in Table 4. The table index values are in the fixed number of bits for all vertices in a primitive block depends on the number of entries in the common byte table as indicated in the compression header. On decompression the number of entries and the byte values are read from the compression header for the common byte table. For each vertex parameter byte data accessed in 3D rendering the fix sized table index value is read from the compressed vertex parameter byte data block to look up the original byte value from the common byte table.

When a byte data block is in common byte delta table format, there are additional data in the compression header for the number of entries in the common byte delta table, the number of bits for the delta values, the 1 bit flag to indicate if the control code is present for mixing delta values with raw byte values in the common byte delta table. The total size of the common byte delta table is also output in the compression header, therefore the data for the common byte delta table can be read correctly from the compression header on decompression as shown in Table 4. Same as in common byte table format the table index values for each byte of the vertex parameter data are output in the compressed vertex data block. The table index values are in the fixed number of bits for all vertices in a primitive block depends on the number of entries in the common byte delta table as indicated in the compression header. On decompression the number of entries, the number of bits for delta values and the control code present flag are read from the compression header for the common byte delta table. Then the delta values are read from the compression header with the fixed number of bits to be added to the previous byte in the common byte table. In the case control code is used, it is read first to decide if the following entry is a delta value or a 8 bit raw byte value. The common byte table can be formed from the decoding the common byte delta table.

Same as in common byte table format for each vertex parameter byte data accessed in 3D rendering the fix sized table index value is read from the compressed vertex parameter byte data block to look up the original byte value from the common byte table reconstructed from the common byte delta table.

Compression and Decompression of Vertex Parameter Data Block

Figure 7:
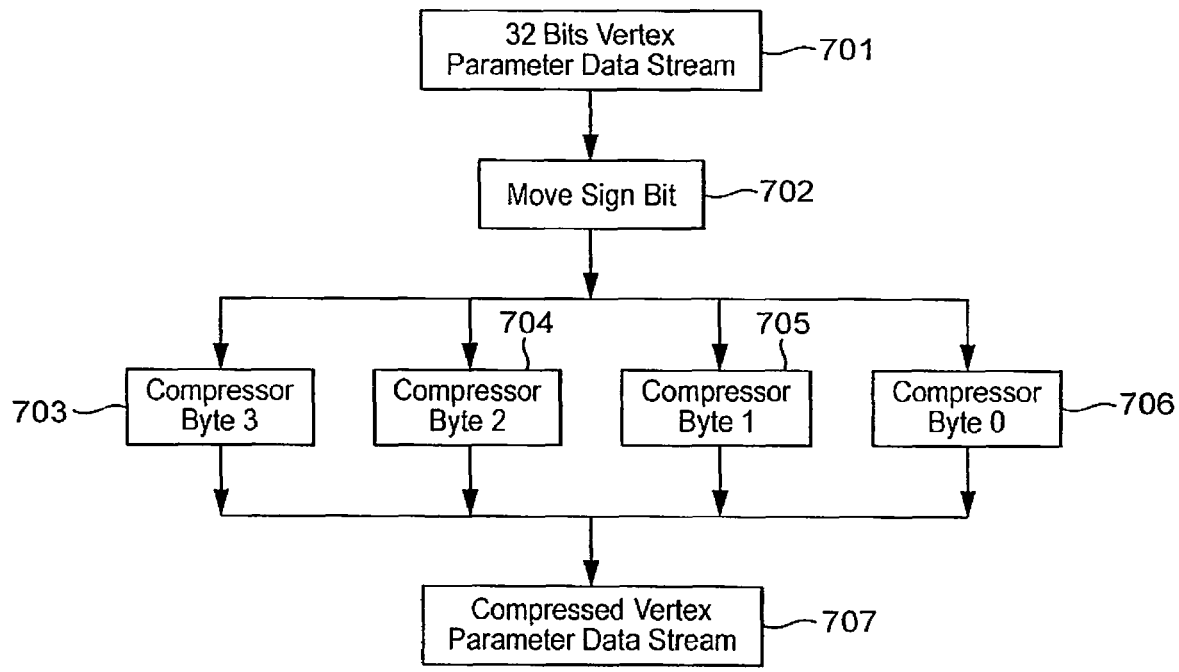
FIG. 7 shows an overview of the preferred embodiment of a compression unit for a 32 bit floating point vertex parameter data block.

In a particular embodiment, the compression unit for a 32 bit floating point vertex parameter data block in a 3D computer graphics system is shown in FIG. 7. As vertex parameter data block 701 from a primitive block comes to the 3D computer graphics system, the sign bit of a 32 bit floating point format value is moved from the most significant bit to the least significant bit at 702 in FIG. 7. The floating point vertex parameter data block then breaks into 4 byte data blocks to be compressed in the compression units 703, 704, 705 and 706 separately. The compressed data from the 4 byte data blocks are merged together for every vertex to form the compressed vertex parameter data in the primitive block as 707 in FIG. 7.

Figure 8:
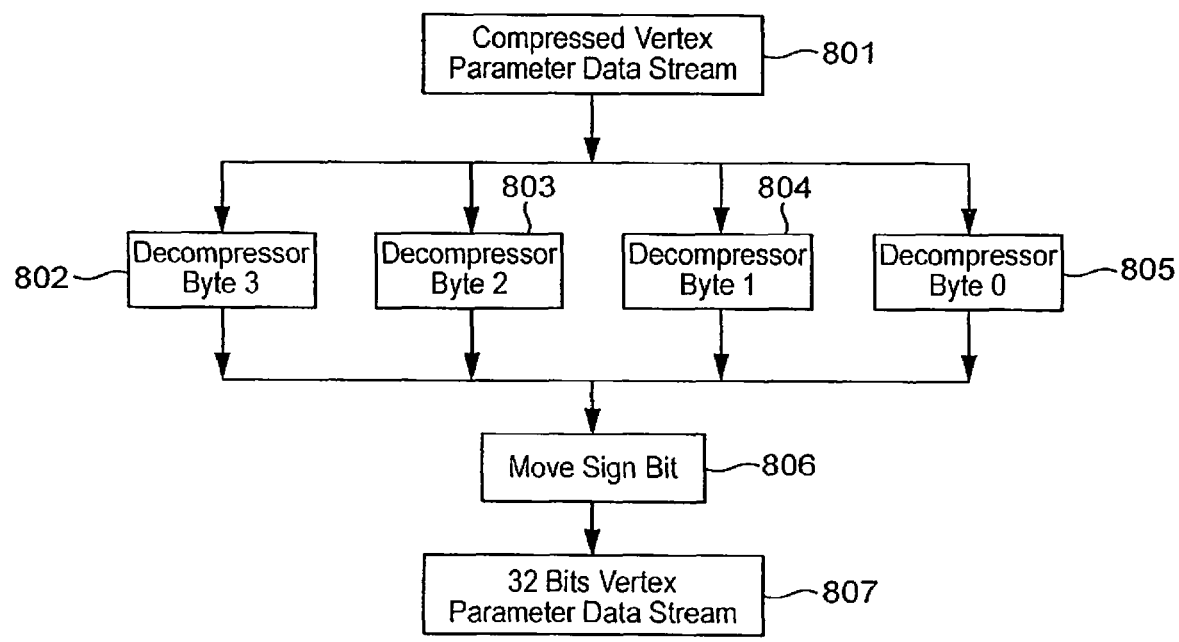
FIG. 8 shows an overview of the preferred embodiment of a decompression unit for a compressed vertex parameter data block.

In a particular embodiment, the decompression unit for a compressed vertex parameter data block in a 3D computer graphics system is shown in FIG. 8. As compressed vertex parameter data block 801 from a primitive block comes to the 3D computer graphics system, the compressed vertex parameter data for a vertex is been broken into 4 pieces of data for the 4 bytes of vertex parameter data according to the compression formats for each byte in the compression header, as shown in Table 4. The 4 pieces of data for each byte are decompressed in the decompression units 802, 803, 804, and 805 separately. The decompressed data from the 4 bytes are merged together for every vertex before the sign bit of a 32 bit floating point format value is moved back from the least significant bit to the most significant bit at 806 in FIG. 8. The 32 bit vertex parameter data is finally reconstructed for every vertex in the primitive block as 807 in FIG. 8.

As shown in FIG. 6, FIG. 7 and FIG. 8 the compression and decompression process in a preferred embodiment of the present invention may be implemented in computer hardware and incorporated into a 3D computer graphics system pipeline, especially for tile based rendering. The combination of algorithms in the compression unit results in a high compression performance for vertex parameter data blocks from 3D computer graphics system. Experiments on vertex parameter data blocks from 3D games shown over 90% of the time a vertex parameter byte data block can be compressed using one of the algorithms. It is expected that an overall 40% data reduction can be achieved for vertex parameter data blocks in 3D computer graphics system using the algorithms presented.

In addition to the compression achievements of vertex parameter data by the presented methods there are also other advantages.

There is no loss of any information from the original vertex parameter data, the algorithms presented are all lossless compression methods. The compression algorithms are suitable for vertex parameter data compression in 3D computer graphics systems require high quality rendered images.

Only limited and configurable storage memory space is required in the compression algorithms for byte origins in the byte delta block algorithm, and the byte table or byte delta table for the common byte table algorithm. The algorithms presented are cost efficient for implementation in 3D computer graphics hardware.

No complicated calculations are needed in the algorithms, the operations for compression and decompression from the algorithms are simple and fast. The algorithms can be used in generating high speed 3D computer graphics renders.

Because the size of compressed data is a fixed number of bits for all the vertices in the primitive block using the compression algorithms, random access is possible for compressed vertex data from any vertices in the primitive block. The feature is especially beneficial for compressing vertex parameter data in a tile based 3D computer graphics hardware system. In which case the primitives from a primitive block may cover many tiles in the tile based 3D computer graphics system. Not all the vertices may be needed for a render in a tile, therefore it is highly desirable to have the vertex parameter data block as randomly accessible during the render process.

As described in prior art for the compression algorithms such as entropy encoding the whole data block needs to be decompressed before any vertex parameter data can be accessed. This has a big impact on the performance of tile based 3D computer graphics systems, especially for primitive blocks which cover many tiles and the vertex parameter data for the whole primitive block have to be decompressed many times.

The compression algorithms enable random access for vertex parameter data in the compressed data block, therefore only the decompressed data for the vertices used in the tile for render are fetched and decompressed in the 3D render process. The compression algorithms have the advantage over conventional compression algorithms for enhanced performance and can be used by tile based 3D computer graphics systems to selectively fetch vertex parameter data from compressed data blocks.

What is claimed is:

1. A method of compressing data in a processing system, the data comprising a plurality of values, the values having a same multiple-byte format, the method comprising:
grouping together bytes with corresponding byte significance to form a plurality of byte blocks; and
compressing a byte block of the plurality of byte blocks using a compression algorithm comprising:
on determining that all the bytes of the byte block have the same byte value, replacing all the bytes of the said byte block with a single byte having the said same byte value to form a compressed byte block.

2. The method of claim 1, wherein the method further comprises:
providing a flag to indicate that the compressed byte block has been compressed by replacing all of the bytes of the byte block with the said same byte value.

3. The method of claim 1 wherein the processing system comprises a computer graphics system.

4. The method of claim 3, wherein the computer graphics system comprises a tile-based 3D computer graphics system.

5. The method of claim 1, wherein the plurality of values are parameter values.

6. The method of claim 1, wherein the data is vertex parameter data, and wherein the plurality of values relate to a respective plurality of vertices.

7. The method of claim 6, wherein the vertex parameter data is randomly accessible from the compressed byte block.

8. An apparatus configured to compress data in a processing system, wherein the data comprises a plurality of values, the values having a same multiple-byte format;
wherein the apparatus is configured to:
group together bytes with corresponding byte significance to form a plurality of byte blocks;
wherein the apparatus comprises at least one compression unit configured to compress a byte block of the plurality of byte blocks using a compression algorithm, the compression comprising:
on determining that all the bytes of the byte block have the same byte value, replacing all the bytes of the said byte block with a single byte having the said same byte value to form a compressed byte block.

9. The apparatus of claim 8, wherein the apparatus is further configured to
provide a flag to indicate that the compressed byte block has been compressed by replacing all of the bytes of the byte block with the said same byte value.

10. The apparatus of claim 9 wherein the processing system comprises a computer graphics system.

11. The apparatus of claim 10 wherein the computer graphics system comprises a tile-based 3D computer graphics system.

12. The apparatus of claim 8, further comprising a memory configured to store the compressed byte block.

13. A method of reconstructing values from compressed data in a processing system, the values having a same multiple-byte format, wherein the compressed data comprises a compressed byte block comprising a byte value, the method comprising:
decompressing the compressed byte block to provide a decompressed byte block, the decompressing comprising using the byte value of the compressed byte block for each byte value of the decompressed byte block, and
reconstructing values having the same multiple-byte format by using the decompressed byte block to represent, in the values, bytes with corresponding byte significance.

14. The method of claim 13 wherein the processing system comprises a computer graphics system.

15. The method of claim 14, wherein the computer graphics system comprises a tile-based 3D computer graphics system.

16. The method of claim 13, wherein the values are parameter values.

17. An apparatus for reconstructing values from compressed data in a processing system, the values having a same multiple-byte format, wherein the compressed data comprises a compressed byte block comprising a byte value, the apparatus comprising:
at least one decompression unit configured to
decompress the compressed byte block to provide a decompressed byte block, comprising using the byte value of the compressed byte block for each byte value of the decompressed byte block, and
reconstruct values having the same multiple-byte format by using the decompressed byte block to represent, in the values, bytes with corresponding byte significance.

18. The apparatus of claim 17, wherein the processing system comprises a computer graphics system.

19. The apparatus of claim 18, wherein the computer graphics system comprises a tile-based 3D computer graphics system.

20. The apparatus of claim 17, further comprising a memory configured to store the decompressed byte block.

* * * * *